United States Patent
Jeon et al.

(10) Patent No.: US 11,156,290 B2
(45) Date of Patent: Oct. 26, 2021

(54) ROTARY ACTUATOR INCLUDING A HOUSING

(71) Applicant: Dura Operating, LLC, Auburn Hills, MI (US)

(72) Inventors: Jinseok Jeon, LaSalle (CA); Aubrey J. Nofzinger, Rochester Hills, MI (US)

(73) Assignee: DUS Operating, Inc., Auburn Hills, MI (US)

( * ) Notice: Subject to any disclaimer, the term of this patent is extended or adjusted under 35 U.S.C. 154(b) by 402 days.

(21) Appl. No.: 16/144,118

(22) Filed: Sep. 27, 2018

(65) Prior Publication Data

US 2020/0103024 A1    Apr. 2, 2020

(51) Int. Cl.

| F16H 63/00 | (2006.01) |
|---|---|
| F16H 63/34 | (2006.01) |
| F16H 61/32 | (2006.01) |
| B60K 17/04 | (2006.01) |
| H02K 7/116 | (2006.01) |
| F16H 61/28 | (2006.01) |
| H02K 29/08 | (2006.01) |

(52) U.S. Cl.
CPC ....... *F16H 63/3466* (2013.01); *B60K 17/046* (2013.01); *F16H 61/32* (2013.01); *F16H 2061/2892* (2013.01); *F16H 2061/326* (2013.01); *H02K 7/116* (2013.01); *H02K 29/08* (2013.01)

(58) Field of Classification Search
CPC ................ F16H 63/3466; F16H 61/32; F16H 2061/2892; F16H 2061/326; F16H 63/3425; B60K 17/046; H02K 7/116; H02K 29/08
See application file for complete search history.

(56) References Cited

U.S. PATENT DOCUMENTS

| 8,070,128 | B2* | 12/2011 | Snyder | ................ F16K 31/3855 |
|---|---|---|---|---|
| | | | | 251/129.03 |
| 2013/0049502 | A1* | 2/2013 | Gotoh | ..................... F02B 37/24 |
| | | | | 310/80 |
| 2014/0020491 | A1* | 1/2014 | Palfenier | ................ H02K 7/116 |
| | | | | 74/421 A |
| 2017/0175885 | A1* | 6/2017 | Jeon | ......................... F16H 61/28 |
| 2019/0309807 | A1* | 10/2019 | Makarow | .................. H02K 5/04 |

\* cited by examiner

*Primary Examiner* — Victor L Macarthur
(74) *Attorney, Agent, or Firm* — Vivacqua Crane (57) ABSTRACT

In at least some implementations, a rotary actuator includes a drive assembly including a motor and one or more gears coupled to and rotated by the motor, an output rotated by the drive assembly and a housing. The housing includes a first portion and a second portion coupled to the first portion to define an interior in which at least part of the drive assembly is received. The housing also includes a first motor locating feature that engages the motor and positions the motor within the housing and prevents rotation of the motor, and a first gear locating feature that locates and retains the position of at least one of said one or more gears. The first motor locating feature and first gear locating feature are both integrally formed in the housing.

19 Claims, 6 Drawing Sheets

ROTARY ACTUATOR INCLUDING A HOUSING

TECHNICAL FIELD

The present disclosure relates generally to a rotary actuator, such as may be used to rotate a lock member of a park lock actuator, that includes a housing in which at least part of the actuator is received.

BACKGROUND

Some vehicles use a transmission park lock that is carried by the transmission to retain the transmission in park until certain driver actions are taken to shift the transmission from park. For example, a vehicle key may need to be in a proper location and a vehicle brake pedal may need to be depressed before the park lock is released. The park lock is electrically actuated and driven by an actuator. Park locks may otherwise be associated with a rotating shaft or axle of the vehicle which may be fitted with a lock body selectively engageable by the park lock to selectively prevent rotation of the shaft, and hence, movement of the vehicle. Some vehicles utilize a shift-by-wire transmission shifting arrangement in which a occupant movable shifter is electronically coupled to an actuator that is in turn coupled to the transmission to shift the transmission among its gears (e.g. park, reverse, neutral and drive gears). Such actuators may have rotary outputs to drive a transmission shift lever.

SUMMARY

In at least some implementations, a rotary actuator includes a drive assembly including a motor and one or more gears coupled to and rotated by the motor, an output rotated by the drive assembly and a housing. The housing includes a first portion and a second portion coupled to the first portion to define an interior in which at least part of the drive assembly is received. The housing also includes a first motor locating feature that engages the motor and positions the motor within the housing and prevents rotation of the motor, and a first gear locating feature that locates and retains the position of at least one of said one or more gears. The first motor locating feature and first gear locating feature are both integrally formed in the housing.

In at least some implementations, the motor includes a first anti-rotation feature and the first motor location feature engages the first anti-rotation feature to inhibit or prevent rotation of the motor relative to the housing. The motor may include a second anti-rotation feature circumferentially offset from the first anti-rotation feature, and the housing may include a second motor locating feature that engages the second anti-rotation feature to inhibit or prevent rotation of the motor relative to the housing. The second motor location feature may be circumferentially offset from the first motor locating feature.

In at least some implementations, the first portion of the housing includes a cavity in the interior and in which at least part of the motor is received, and the first motor location feature includes a projection extending inwardly from a wall that defines part of the cavity, and the projection extends into and defines part of the cavity. In at least some implementations, the first portion of the housing includes a cavity in the interior and in which at least part of the motor is received, and the second motor location feature includes a projection extending into the interior from the second portion of the housing and engaged with the motor.

In at least some implementations, the first gear locating feature includes a projection about which at least one gear rotates. The first gear locating feature may include a counterbore having an inwardly extending surface that supports one gear of said one or more gears, and the inwardly extending surface may be perpendicular to the axis of rotation of said one gear. In at least some implementations, one gear of said one or more gears has an axis of rotation and the first gear locating feature includes an axially extending projection that axially overlaps at least part of said one gear to maintain an axial position of said one gear or to inhibit radial movement of said one gear relative to the projection.

In at least some implementations, the motor has an axial length defined between two parallel planes at the axial ends of the motor, and the one or more gears are axially positioned between the two planes. The motor has a radial width defined between two parallel planes at opposite radially outer surfaces of the motor, and the one or more gears may be positioned between the two planes or extend outwardly of one or both planes by a distance less than 20% of the diameter of the motor.

In at least some implementations, one of said one or more gears is an annular gear with inwardly extending teeth that are formed integrally in the same piece of material that defines either the first portion or second portion of the housing.

In at least some implementations, the output is received at least partially within the interior for rotation about an axis, and the actuator also includes a bushing or bearing carried by the housing and engaged with the output. The actuator may include a circuit board carried by the housing and the housing may include at least one circuit board retaining feature that engages the circuit board and maintains the position of the circuit board within the interior. The motor has an axial length defined between two parallel planes at the axial ends of the motor, and the circuit board may be positioned between the two planes. One or more gears may also be positioned between the two planes.

In at least some implementations, an actuator for a rotatable lock member includes a drive assembly including a motor and one or more gears coupled to and rotated by the motor, an output rotated by the drive assembly, and a housing including a first portion and a second portion coupled to the first portion to define an interior in which at least part of the drive assembly and at least part of the output are received. The first portion includes a first motor locating feature that engages the motor, retains the position of the motor within the housing and inhibits rotation of the motor relative to the housing. The second portion includes a second motor locating feature that engages the motor, retains the position of the motor within the housing and inhibits rotation of the motor relative to the housing. A first gear locating feature locates and retains the position of at least one of said one or more gears. And a first output locating feature that retains the position of the output relative to the housing. The first motor locating feature, second motor locating feature, first gear locating feature and first output locating feature are fixed to and/or integrally formed in the housing.

In at least some implementations, the motor has an axis, and the first motor locating feature is circumferentially offset and not axially aligned with the second motor locating feature. The first output locating feature may include a recess that receives a bushing or bearing that is carried by the housing and engaged with the output. The actuator may also include a circuit board carried by the housing and the housing may include at least one circuit board retaining feature that engages the circuit board and maintains the position of the circuit board within the interior. In at least some implementations, the actuator includes a planetary gear set having a sun gear driven by the motor, a plurality of planet gears driven by the sun gear, a ring gear defined by teeth extending inwardly from a wall that defines part of the housing and a planet carrier having posts on which the planet gears are arranged, and wherein the output co-rotates with the planet carrier.

As will be appreciated from the above summary description and the following more detailed description, the various features may be used in any desired combination including one, more than one or all of the features noted herein, to the extent such features are not mutually exclusive. The disclosure herein is not intended to be limited to any particular combination of features, nor to limit the possible combinations, except as set forth in the appended claims.

BRIEF DESCRIPTION OF THE DRAWINGS

The following detailed description of some implementations of a shifter will be set forth with regard to the accompanying drawings, in which.

DETAILED DESCRIPTION

Figure 1:
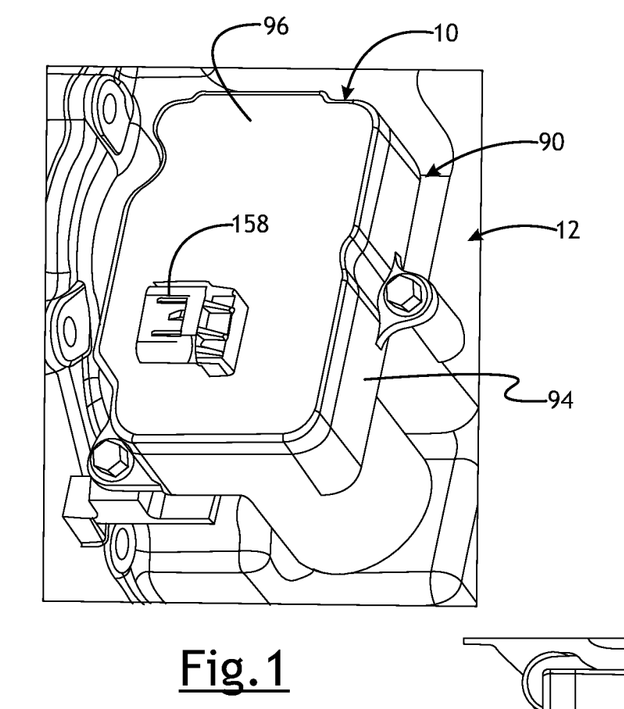
FIG. 1 is a fragmentary perspective view of an actuator mounted to a vehicle transmission.
Figure 2:
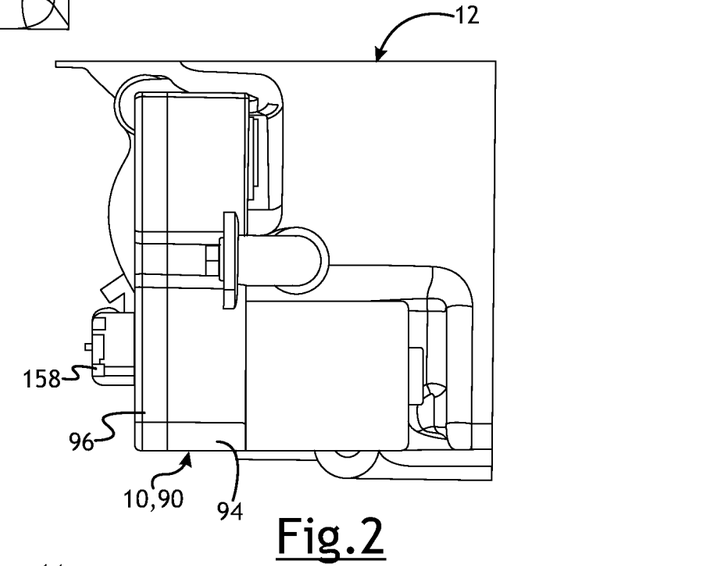
FIG. 2 is a fragmentary side view of the actuator and transmission.
Figure 3:
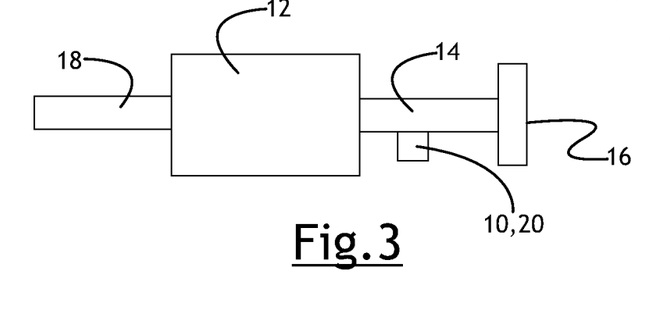
FIG. 3 is a diagrammatic view of a power transmission arrangement including a park lock assembly driven by an actuator.

Referring in more detail to the drawings, FIGS. 1 and 2 illustrate an actuator 10 coupled to a vehicle transmission 12 to drive a component of the transmission between at least two positions. The transmission 12 may be part of an internal combustion, hybrid or electric vehicle powertrain, and with the latter may be part of a so-called e-axle that may include an electric motor, one or more gears with an output shaft 14 coupled to the gear(s), as shown in FIG. 3. The output shaft 14 may also be coupled to a vehicle wheel 16 to drive the wheel for rotation. When the vehicle is parked, it may be desirable to provide a park lock assembly 20 to, in at least some implementations, lock the axle or some other component of the transmission (e.g. the output shaft 14) against rotation, to prevent or at least substantially inhibit rotation of the wheels of the vehicle. In at least some implementations, the park lock assembly 20 is associated with and operable to selectively prevent rotation of the output shaft 14, such as but not limited to, engaging a gear or stop feature on the output shaft or engaging a transmission gear to which the output shaft is coupled. The park lock assembly 20 may be located within the transmission as in the implementation shown in FIGS. 1 and 2, or located downstream of the transmission 12 and any gear(s), if desired, such as is diagrammatically shown in FIG. 3 wherein the park lock assembly is associated with the output shaft 14 outboard of the transmission 12 which is driven by an input shaft 18.

Figure 4:
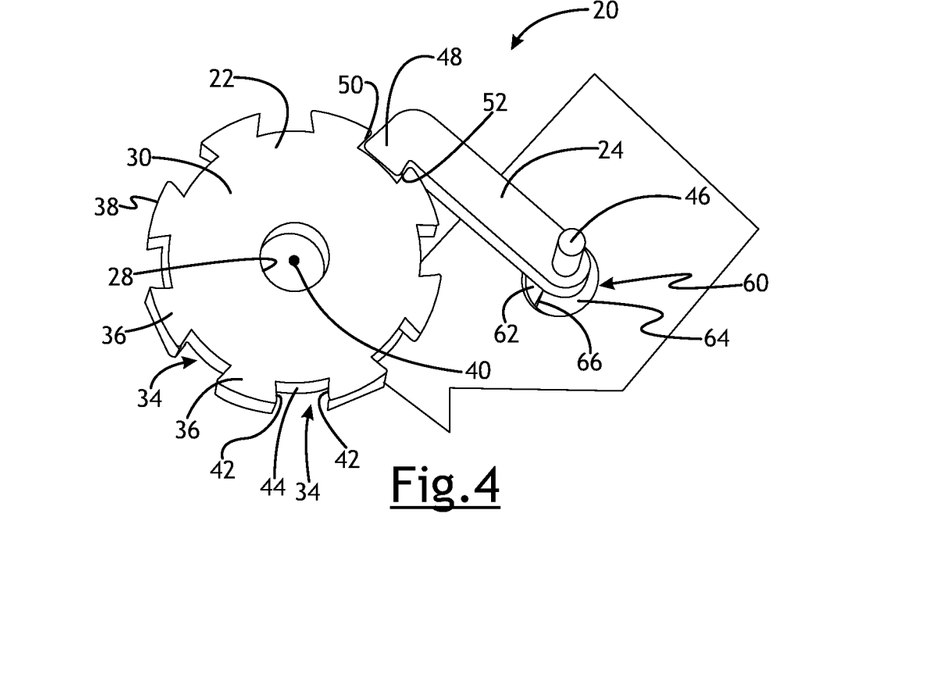
FIG. 4 is a plan view of a park lock assembly and a lock body engageable by the lock assembly.
Figure 5:
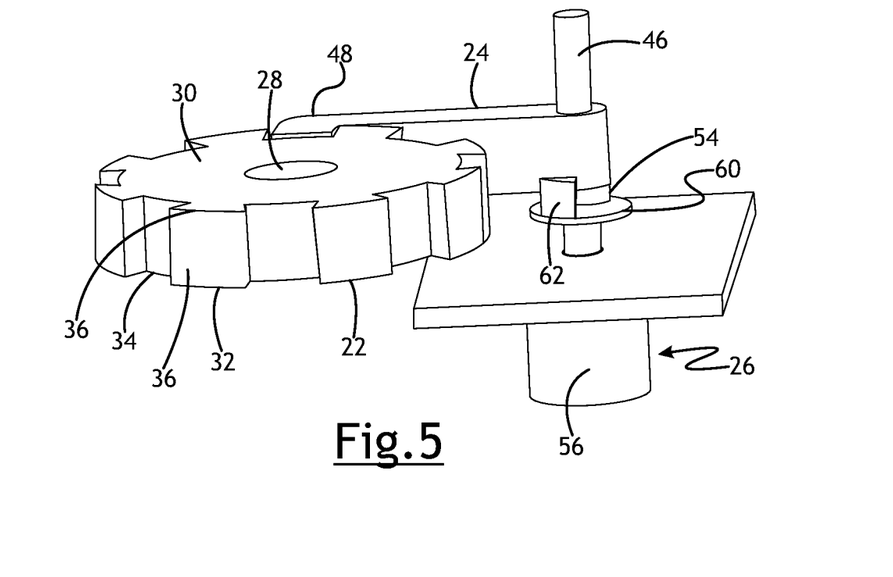
FIG. 5 is a perspective view of the components shown in FIG. 4.
Figure 6:
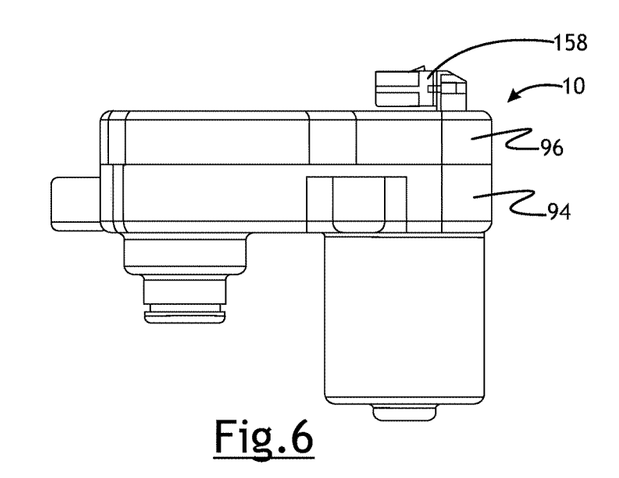
FIG. 6 is a front view of the actuator.
Figure 7:
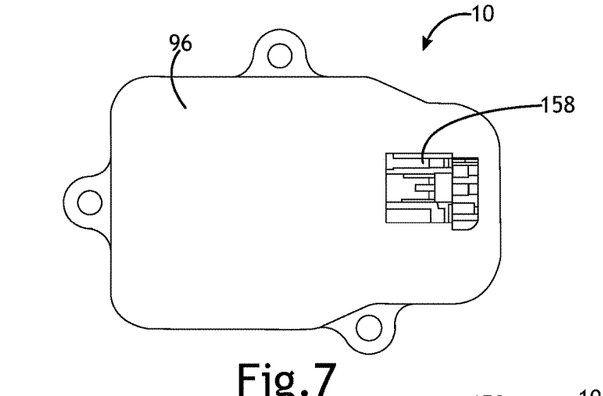
FIG. 7 is a plan view of the actuator.
Figure 8:
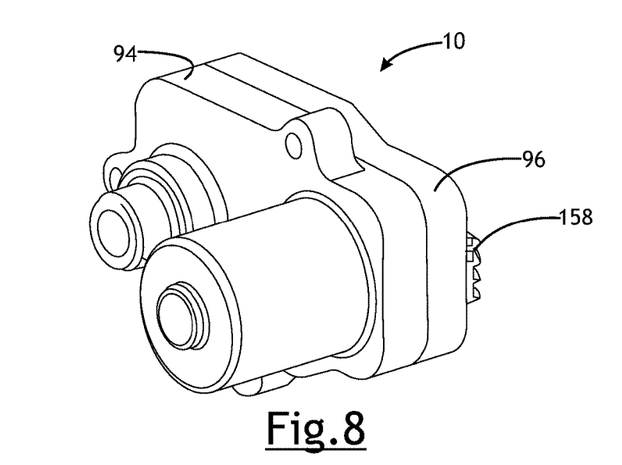
FIG. 8 is a perspective bottom view of the actuator.
Figure 9:
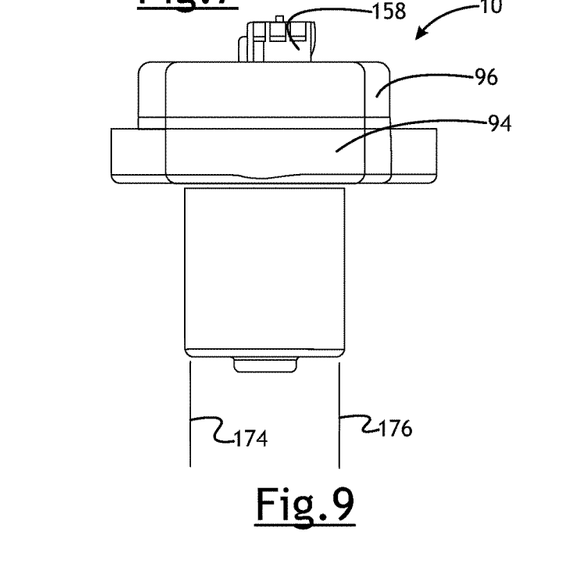
FIG. 9 is a right side view of the actuator.

In at least some implementations, such as is shown in FIGS. 4 and 5, the park lock assembly 20 includes a lock body 22 coupled to the output shaft (as described below) for co-rotation with the output shaft, a lock member 24 movable relative to the lock body 22 and selectively engageable with the lock body, and an actuator 26 that drives the lock member relative to the lock body.

The lock body 22 may be fixed to the output shaft for co-rotation with the output shaft 14. In this way, engaging and preventing rotation of the lock body 22 may also prevent rotation of the output shaft. To couple the lock body 22 to the output shaft 14, in at least some implementations, the lock body has a central bore 28 through which output shaft coaxially extends. The lock body may be generally cylindrical with axially opposed faces 30, 32 that extend radially from the central bore 28 to a radial outer periphery of the lock body. To facilitate engagement of the lock body 22 by the lock member 24, the lock body 22 may have a plurality of voids 34 that may be formed in or open to the radial outer periphery of the lock body. Multiple lands 36 may be defined with each land defined between two adjacent voids 34. With the voids 34 open to the radial outer periphery of the lock body 22, a radial outer surface 38 of the lock body is not at a constant radial distance from a central axis 40 of the lock body. To prevent rotation of the lock body 22 in either direction when engaged by the lock member 24, the voids 34 may have rotationally opposed stop surfaces 42, that is, axially and radially extending surfaces that face in generally opposite directions and are circumferentially spaced apart. In at least some implementations, the stop surfaces 42 are either parallel to each other or at an angle such that imaginary planes including the stop surfaces intersect outboard of the radial outer periphery 38 of the lock body. Thus, the void 34 either has the same circumferential length along its radial depth (e.g. its radial extent from the outer surface to a radially inner surface of the void) or the circumferential length increases from the outer surface 38 to a radially inner surface 44 of the void.

To selectively engage and prevent rotation of the lock body 22, the lock member 24 is movable relative to the lock body. In at least some implementations, the lock member 24 may be pivoted relative to the lock body, although other movements such as sliding or more complex paths of motion may be used, if desired. In the example shown, the lock member 24 is rotatable or pivotable about a shaft 46 that may be integral with (e.g. formed in the same piece of material as the lock member) or it may be coupled to the shaft. The shaft 46 may be coupled to an output member 47 (FIGS. 10-12) of the actuator 10 which is rotated by a motor 56 (FIGS. 10-12), so that the lock member 24 rotates relative to the lock body 22. The motor 56 may be reversible so that the lock member 24 can be rotated in both directions relative to the lock body 22 to engage and disengage the lock member from the lock body as desired.

In at least some implementations, an axis of the shaft 46 may be parallel to the axis 40 of rotation of the output shaft 14 and lock body 22. The lock member 24 may be rotatable relative to the shaft 46, or it may be fixed to the shaft for rotation with the shaft. When rotatable relative to the shaft 46, a spring 54 may be disposed between the shaft and lock member 24 to yieldably bias the lock member 24 for rotation with the shaft 46, but to permit some relative rotation of the lock member relative to the shaft, as will be described in further detail below. The lock member 24 includes an engagement portion 48 that is adapted for receipt in a void 34 of the lock body 22, or is adapted to otherwise cooperate with a feature of the lock body to inhibit or prevent rotation of the lock body when the lock member is in its engaged position.

The engagement portion 48 may be defined by or at an end of the lock member 24, and as shown in FIGS. 4 and 5, may be defined in an end that is bent to face generally circumferentially relative to the pivot axis. The engagement portion may be complementarily shaped to the void(s) 34 and smaller than the void(s) for receipt in the void(s). As best shown in FIG. 4, radially spaced apart sides 50, 52 (relative to pivot axis) of the engagement portion 48 may be tapered such that a free end of the engagement portion has a greater radial size than does a portion spaced from the free end. The greater radial dimension is still less than the smallest circumferential length of each void 34 (relative to the lock body axis) so that the engagement portion 48 can fit into the void 34 as shown. The engagement portion 48 may have same or similar (e.g. within 50%) axial width as the lock body 22, if desired. Significant force may be applied to the lock member 24 via the lock body 22, for example, if the vehicle is parked on a hill and the lock body and lock member hold the vehicle against rolling down the hill.

In some implementations, a single actuator 10 may drive the lock member 24 into and out of engagement with the lock body 22, and in other implementations, more than one actuator may be used. In at least some implementations, a second actuator such as the spring 54, assists or drives the lock member 24 toward the lock body 22, and an electrically powered actuator, such as an electric motor 56, drives the lock member away from the lock body. In the non-limiting example shown in FIGS. 2-6, the actuator 10 includes the reversible electric motor 56 that rotates in a first direction to cause the lock member 24 to engage the lock body 22 and in a second, opposite direction to disengage the lock member from the lock body. While the motor 56 controls rotation of the lock member 24 toward the lock body 22, this motion may be provided to the lock member through or via the spring 54, as described in more detail below.

As best shown in FIGS. 4 and 5, the drive coupling 60 as shown has a central bore through which drive shaft 46 extends, is received axially between the motor 56 and the lock member 24, and has an outwardly extending drive tab 62 that is selectively engageable with the lock member 24. The spring 54 may be positioned axially between the drive coupling 60 and lock member 24 although the spring can be otherwise arranged. The drive coupling 60 may have radially extending flange 64 that provides a base that supports spring 54 and/or the lock member 24 in a desired axial location aligned with lock body 22.

The spring 54 may be received between the lock member 24 and the actuator output 47, or the coupling 60 which may be driven by the output, and arranged to provide a rotational force on the lock member 24. In at least some implementations, the spring 54 may be a torsion spring having one end engaged with the drive tab 62 of the coupling 60 and another end engaged with a surface (e.g. an outer surface) of the lock member 24. Rotation of the coupling 60 in one direction may compress the spring 54 and increase the force the spring provides on the lock member 24 to rotate the lock member toward the lock body 22. Rotation of the coupling 60 in the opposite direction reduces the spring force and may engage the drive tab 62 with the lock member 24 to rotate the lock member away from the lock body 22. In this way, rotation of the shaft 46 by the motor 56 controls both engagement and disengagement of the lock member 24 and the lock body 22.

With the spring 54 between the actuator (e.g. motor 56 and drive coupling 60) and the lock member 24, the lock member may be yieldably driven toward the lock body 22. If a void 34 of the lock body 22 is not aligned with the engagement portion 48 of the lock member 24, then the engagement portion of the lock member will engage a land 36 of the lock body and be held against the land by the force of the spring 54 acting on the lock member. When the lock body 22 rotates enough to align a void 34 with the engagement member 48, the lock member 24 will rotate about the drive shaft 46 under the spring force and the engagement member will enter the aligned void. In at least some implementations, the voids 34 and engagement portion 48 are sized and arranged, and the spring rate or force is chosen, so that engagement portion is not received within void unless the output shaft is rotating at a speed associated with the vehicle traveling less than 2 or 3 miles per hour. Thus, even if the park lock assembly 20 is actuated when the vehicle is moving at a faster rate, the park lock assembly will not engage. Instead, the lock member 24 may bounce outwardly from or slide along the lands 36 of the rotating lock body 22 without entering a void 34 of the lock body. Thus, the lock member 24 may rotate about the drive shaft 46 as permitted by the spring 54.

Figure 10:
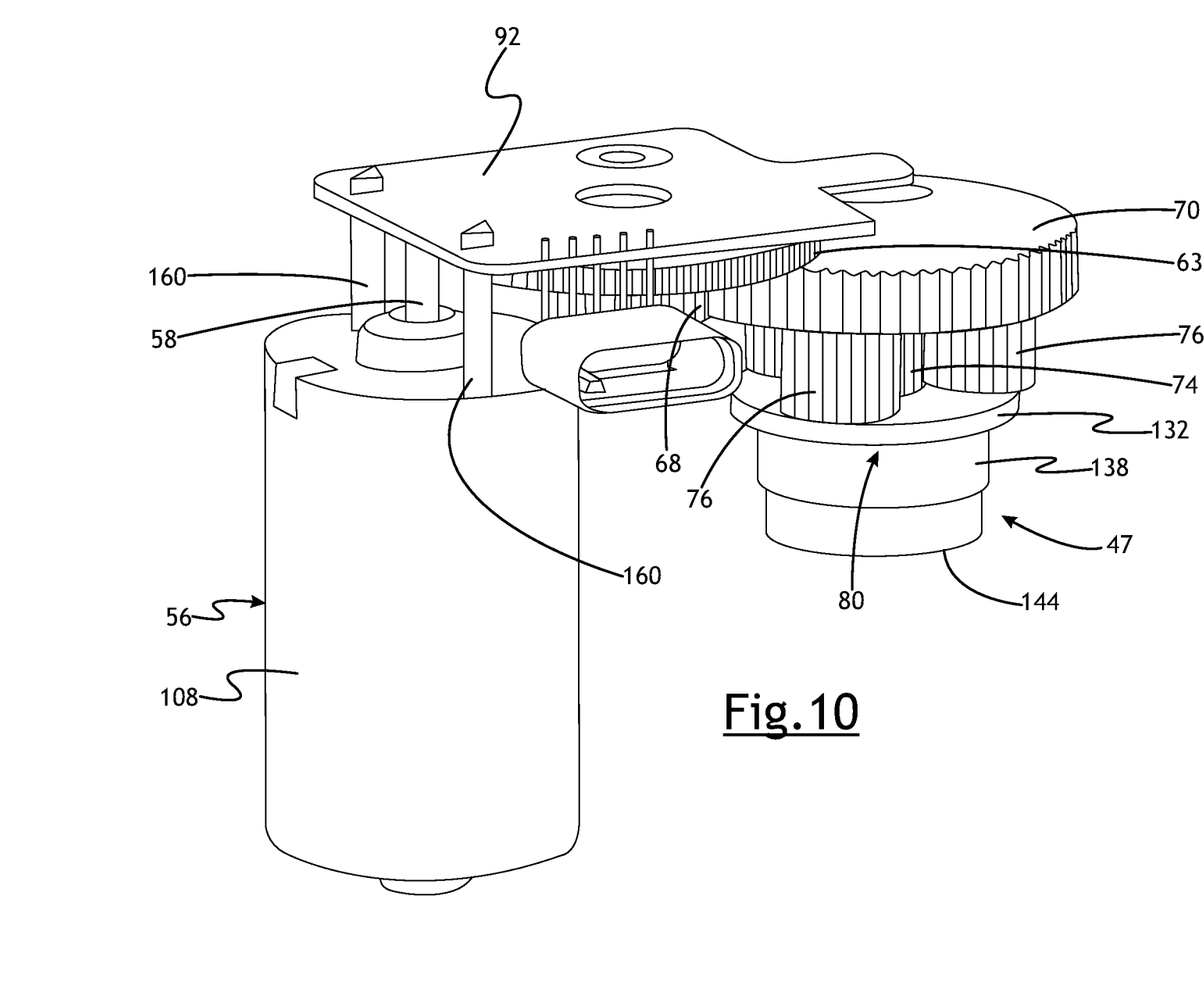
FIG. 10 is a perspective view of a drive assembly and an output member of the actuator.
Figure 11:
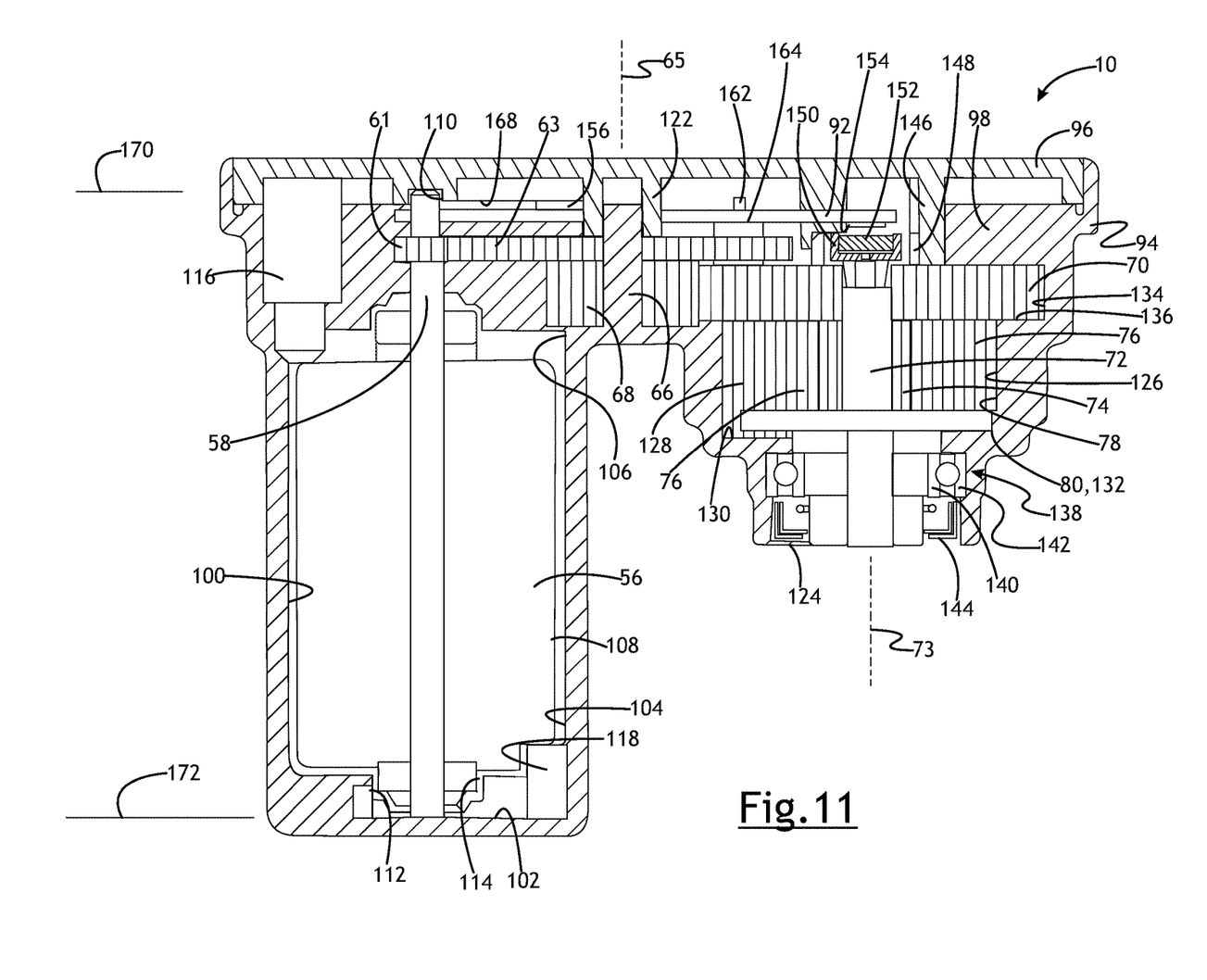
FIG. 11 is a partially sectioned front view of the actuator showing a housing, the drive assembly and the output member.
Figure 12:
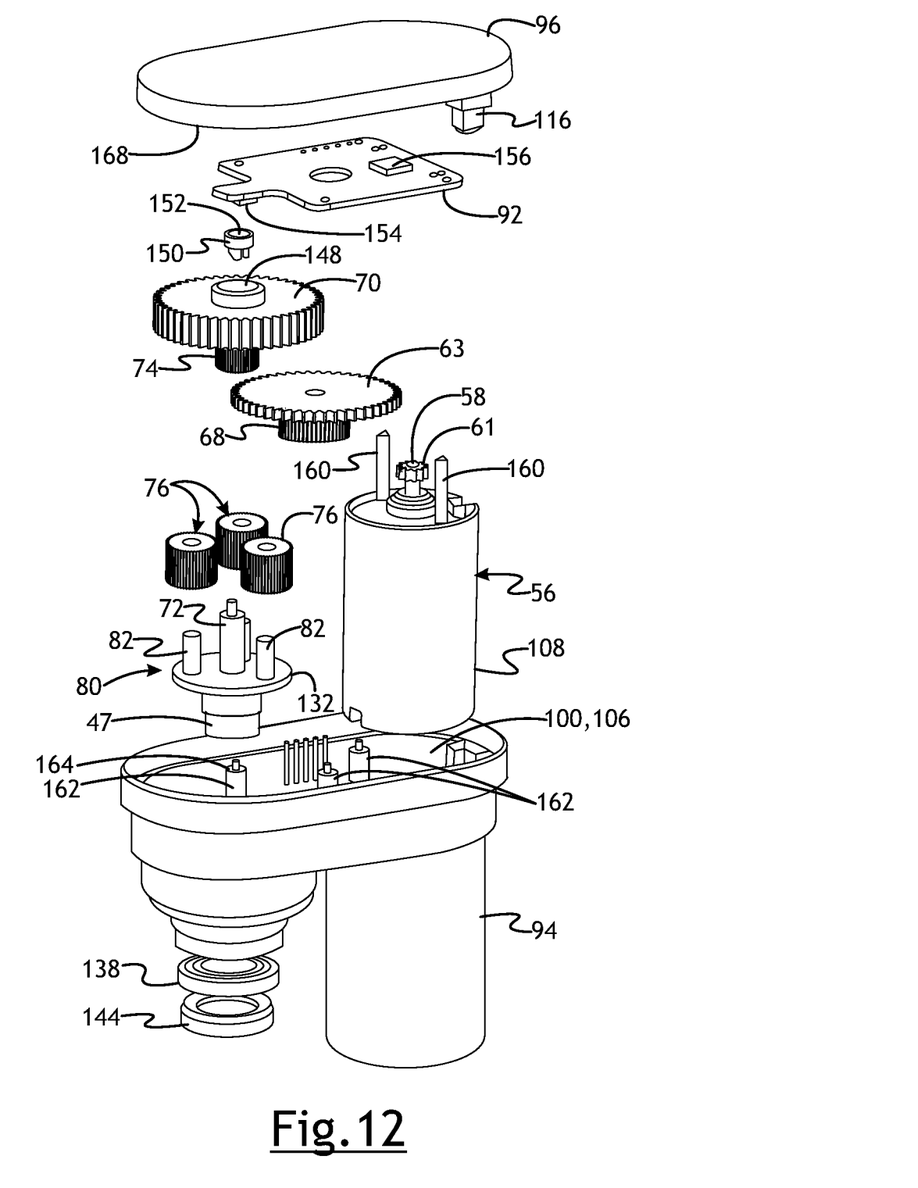
FIG. 12 is an exploded view of the actuator.

To drive the output 47, as shown in FIGS. 10-12, the actuator may include a drive assembly that includes the motor 56 and one or more gears coupled between the motor and the output 47. In at least some implementations, the motor 56 may rotate a drive shaft 58 that rotates a drive gear 61 that is fixed to the drive shaft 58 for co-rotation with the drive shaft. The drive gear 61 may rotate one or more gears that are coupled between the drive gear 61 and the output member 47 to rotate the output member and the shaft 46. The gear or gears may provide a speed and torque change to drive the lock member 24 at a desired rate or with a desired torque.

In the example shown, multiple gears are provided including a first gear 63 that is larger than and has more teeth than the drive gear 61 to provide a first stage of speed reduction. The first gear 63 rotates about an axis 65 defined by an axle or post 66. A second gear 68 is fixed to or otherwise rotates with and is coaxial with the first gear 63, and may have a lesser number of teeth than the first gear, but more than the drive gear 61, as desired. A third gear 70 may be meshed with and driven for rotation by the second gear 68, may have a greater number of teeth than the second gear 68, may be rotated about a shaft 72 defining an axis 73 that is parallel to but radially offset from the post 66, and may be coupled to or otherwise arranged for co-rotation with a fourth gear 74 that is coaxially with the third gear 70. The fourth gear 74 may have fewer teeth than the third gear 70 and may define a sun gear of a planetary gear set. The fourth/sun gear 74 is meshed with multiple planet gears 76 that are in turn meshed with an annular or ring gear 78. The planet gears 76 are coupled to a planet carrier 80 that includes posts 82 (FIG. 12) about which the planet gears rotate, the posts 82 defining axes of rotation of the planet gears 76 that are spaced apart but parallel to each other and to the axis 73. The planet carrier 80 may be coupled to the output 47 so that the output rotates with the planet carrier as the planet gears 76 rotate relative to the ring gear 78. In the implementations shown, the gears 61, 63, 68, 70, 74, 76, 78 are spur gears. Other types, numbers of and other arrangements of gears may be used, as desired, to obtain a desired speed or torque for the rotation of the lock member.

As shown in FIGS. 1, 2, 6-9, 11 and 12, the actuator 10 may include a housing 90 in which various components or all of the components of the actuator are received, including but not limited to the motor 56, gears, output 47 (some or all of the output) and a circuit board 92 which may include controls for the actuator and, as desired, other systems. The housing 90 may include a first portion 94 and a second portion 96 coupled together, hereafter called a base 94 and a cover 96, respectively, without intending to limit the relative sizes, purpose or functions of either portion. The base 94 and cover 96 may be coupled together and collectively define an interior 98 (FIG. 11) in which one or more of the actuator components are received.

In at least some implementations, the housing 90 includes one or more locating features for the motor. One or more of these features may be provided to prevent rotation of the motor 56 relative to the housing 90, and to prevent axial or radial movement of the motor relative to the housing. The housing 90, that is, the base 94 and/or cover 96, may include or define a cavity 100 in which at least a portion of the motor 86 is received. The cavity 100 defines in part of the housing interior 98 and may be defined at least in part by the base 94 and may have a lower surface 102 that extends inwardly from a cylindrical sidewall surface 104, and an open end 106 through which the motor 56 is received when the motor is inserted into the cavity 100. At least a portion of a sidewall 108 of the motor 56 (e.g. an outer casing of the motor) may be engaged by the sidewall surface 104 defining the cavity 100 to laterally or radially retain the position of the motor 56. A first recess 110 (FIG. 11) may be provided in the cover 96 to receive and/or support an end of the motor drive shaft 58 which may define one axial end of the motor 56. A second recess or open area 112 may be provided in the base 94 to receive and/or support an opposite end of the motor 56. The recess or open area 112 may be complementary in shape to a projection 114 at the opposite or second axial end of the motor 56, shown as a portion of a motor casing having a circular exterior and a reduced diameter compared to the main sidewall 108 of the motor 56. The projection 114 may be defined in part by a bearing supported by the motor casing and in which a second end of the drive shaft 58 is received.

In at least some implementations, one or both of the base 94 and cover 96 include at least one surface that defines a motor locating feature that is engageable by a portion of the motor 56, e.g. an external casing of the motor, or the motor may include one or more outwardly extending portions that are engageable with one of the housing surfaces or partially received within a void in the housing. The housing surface(s) may be defined on a projection(s) that extends at least partially into the motor cavity 100. The motor 56 may include one or more anti-rotation surfaces, such as but not limited to a generally planar portion of the casing, or a void in which a housing projection may be at least partially received. As shown in FIGS. 11 and 12, the cover 96 may include a motor locating feature in the form of a depending projection 116 that engages the motor 56. The projection 116 may press the motor against the lower inner surface 102 of the base 94 to axially position and retain the motor 56 between the base 94 and cover 96, damp vibrations of the motor 56 and/or to prevent rotation of the motor relative to the housing 90. The base 94 may include a motor locating feature in the form of an inwardly extending stop surface 118 (e.g. it extends into the cavity 100 and the cavity has a smaller cross-sectional area in that portion of the cavity 100) adapted to engage the motor 56 to help radially position the motor, damp vibrations and/or prevent rotation of the motor relative to the housing 90. The base stop surface 118 may be circumferentially offset from the housing projection 116 to provide two different circumferential locations of the motor locating features, and these features may be offset by 180 degrees (plus or minus 30 degrees) to provide opposed or generally opposed location/retention features. Further, the locating features may each prevent motor rotation in one or both directions, and the base and cover motor locating features 116, 118 may be opposed to prevent rotation in opposed directions to collectively prevent rotation of the motor in either direction. Additional motor locating features may be provided by one or both of the base 94 and the cover 96, as desired.

To facilitate assembly and positively locating and retaining one or more of the gears, the housing 90 may include one or more gear locating features. The gear locating features may include one or more posts about which the gears may rotate, or one or more surfaces that journal or support a component or gear for rotation or receive and/or retain a bearing that journals a component or gear for rotation. In the implementation shown, the first and second gears 63, 68 co-rotate about the post 66 that is carried by, fixed to (e.g. cantilevered from) and/or formed in one piece with the base 94 of the housing 90. The post 66 could alternately be defined by and formed integrally with the cover 96. In the implementation shown, the cover 96 includes a recess or annular boss 122 in which a free end of the post 66 is received in assembly. Thus, the cover 96 may support the post 66 against flexing or other movement caused by forces on the post in use. The post 66 may be fixed at one end and free at its other end, with the free end arranged to receive the gears 63, 68 onto the post 66 in the same direction in which the motor 56 is inserted into the cavity 100. That is, the cavity 100 in the base 94 and the post 66 may both face in the same direction, and axes of both may be parallel to facilitate assembly of the motor 56 and gears 63, 68 in the same direction. If desired, a bushing or bearing may be received between the gears 63, 68 and the post 66.

The housing 90 may include one or more additional gear locating features to receive, retain and/or locate the other gears. The gear locating features may include one or more posts around which the gears are received or recesses in which the gears are received. In the implementation shown, the base 94 includes a bore 124 through which the output 47 extends, or via which access to the output 47 is provided to permit coupling the lock member 24 or the shaft 46 for the lock member 24 with the output 47. And the base 94 may include one or more counterbores that each define an annular cavity in which one or more gears may be received. In the example shown, the shaft 72 about which the sun gear 74 rotates is formed integrally with (i.e. in the same piece of material as) or otherwise fixed to the output 47. The planet carrier 80 may also be integral with the output 47 (i.e. formed in the same piece of material) and includes the posts 82 about which the planet gears 76 rotate. The planet gears 76 may be meshed with the ring gear 78, which may be integrally formed in the housing, such as in a counterbore 126 of the base 94 that is coaxial with the bore 124 and the output 47. That is, the ring gear 78 may be defined by teeth 128 formed in the same piece of material as the base 94 and extending radially inwardly from an annular wall defining the counterbore 126. The counterbore 126 may be defined in a part by an annular, inwardly extending surface or shoulder 130 upon which a base 132 of the planet carrier 80 may be received to axially locate the planet carrier and output 47. A second counterbore 134 may be defined in part by a second, annular and inwardly extending surface or shoulder 136 which may support and axially locate the third gear, which may have a diameter greater than the inner diameter of the ring gear 78, if desired. An output locating feature may be provided to locate and retain the position of the output relative to the housing. For example, a bearing or bushing 138 may be received between part of the output 47 and the base 94 (e.g. with a bearing inner race 140 coupled to the exterior of the output 47 and a bearing outer race 142 coupled to the base 94) to journal the output 47 for rotation and radially maintain the position of the output, planet carrier 80 and central shaft 72. The bearing or bushing or a recess in the housing that receives the bearing or bushing may be considered to be an output locating feature. Thus, the sun, planet and ring gears, 74, 76 and 78, respectively, as well as the planet carrier 80 and output 47, are maintained in a desired location and arrangement relative to the base 94. To prevent contaminants from entering the interior 98 via the bore 124, a seal 144 may be provided between the output 47 and the base 94.

The cover 96 may also include one or more gear locating features, as desired. In the implementation shown, the cover 96 includes an axially extending boss or projection 146 that surrounds part of an annular flange 148 that extends coaxially from the third gear 70. The projection 146 may axially overlap at least part of the third gear 70 (e.g. the flange 148) to maintain an axial position of the third gear 70 and/or to inhibit radial movement of the third gear 70 relative to the projection, which may help to support and prevent skewing of the third gear 70 relative to the other gears. The flange 148 may define a recess in which a magnet carrier 150 and magnet 152 are received, which permit detection of the rotary position of at least part of the drive assembly, such as the output. In the example shown the magnet carrier 150 is coupled to the central shaft 72, and the magnet 152 is retained by the magnet carrier. Thus, the magnet 152 rotates as the output 47 rotates and the position of the output can be positively determined by a magnetically responsive sensor 154 mounted to the circuit board 92, such as but not limited to, a hall-effect sensor. The magnet 152 could instead be carried by the third gear 70, or a different gear in the drive assembly with the actual position of the output 47 being a function of the tolerances in the drive assembly which may permit some relative rotation of one or more gears and the output 47.

The actuator 10 may also include a control unit that may include the circuit board 92 and one or more controllers for the actuator, including a controller 156 that provides power to the motor 56 to cause a desired movement of the output 47 and lock member 24 and/or the position sensor 154 that is responsive to the rotation of the magnet 152. The controller 156 and position sensor 154, as well as other electronic circuitry and components may be mounted on the circuit board 92 that is received within the interior 98 of the housing 90. The housing 90 may include a pass through electrical connector 158 that permits coupling to the circuit board 92 through the housing, in known manner. The connector 158 may extend through or be formed as part of the base 94 or the cover 96. The motor 56 may include terminals 160 that extend outwardly from the casing and via which the motor 56 is powered. The terminals 160 may be coupled to the circuit board 92 via wires, or the terminals 160 may be directly connected to the circuit board 92, as shown in FIG. 10, such as by suitable connectors or by soldering. The magnetic sensor 154 may be carried by the circuit board 92 near the magnet 152, such as directly axially over the magnet, so that the sensor is responsive to the moving magnetic field when the magnet is rotated.

To mount the circuit board 92, the housing may include one or more circuit board retaining features, shown as several spaced apart pegs 162 carried by and, in some implementations, formed integrally with the base 94 (that is, in the same piece of material as the base). The pegs 162 define support surfaces 164 (FIG. 11) on which the circuit board 92 is received. The cover 96 may include one or more inwardly extending mounting or retaining features that engage the circuit board 92 and retain the position of the circuit board on and relative to the pegs 162, or retainers (e.g. clips) could be fixed to the pegs after the circuit board is mounted on the pegs, or the pegs/circuit board could be heat staked to couple the circuit board to the base 94. The circuit board 92 may be positioned adjacent the cover 96, and between the cover and at least some of the gears in the drive assembly. The motor 56 may be on the opposite side of the circuit board 92 as the cover 96, or at least an upper wall 168 of the cover 96. In at least some implementations, some portion of the motor 56, housing 90 and/or drive assembly may extend through openings in the circuit board 92, or adjacent to a periphery of the circuit board. In the example shown, the motor drive shaft 58, the post 66 carried by the base 94 and the boss 122 extending from the cover 96 extend through spaced apart openings in the circuit board 92, and the projection that extends from the cover 94 to the flange 148 on the third gear 70 extends beyond the axial location of the circuit board 92 and includes a cutout or is otherwise shaped to accommodate the circuit board.

The motor 56 may have a size including an axial length in combination with the outer diameter of the motor which may be a function of the power needed from the motor. In at least some implementations, it may be desirable to have a reduced axial length for the actuator 10, so the drive assembly may extend laterally (not parallel to the axial direction, and including but not limited to perpendicular to axial) from the motor 56, and the gears may be laterally offset from but overlapped in the axial direction by the motor 56. That is, the gears may be received between parallel planes 170, 172 (FIG. 11) drawn at the opposite axial ends of the motor 56, such that the gears do not extend beyond the axial limits of the motor. In at least some implementations, the circuit board likewise is located within the axial extent of the motor (e.g. between the planes 170, 172). Hence, as generally shown in FIGS. 6, and 8-12, the axial length of the motor 56 defines most of the axial length of the actuator 10, with some allowance for the axial thickness of the portions of the base 94 and cover 96 that axially overlie and are located outboard of the axial limits of the motor.

The gears may also be fully or at least mostly overlapped in the radial direction by the motor 56, as generally shown in FIGS. 8-12. That is, the gears may be received fully between parallel planes 174, 176 (FIG. 9) drawn at opposed portions of the radially outer surface of the motor 56, such that the gears do not extend beyond the radial extent or limits of the motor, or the gears may extend outwardly of one or both planes 174, 176 by a distance less than 20% of the diameter of the motor 56. Hence, the radial width of the motor 56 defines most of the radial width of the actuator 10, with some allowance for the thickness of the portions of the base 94 and cover 96 that radially overlie and are located outboard of the radial limits of the motor, and for the circuit board and one or more gears that may be larger in the radial direction than the motor in at least some implementations.

Accordingly, the housing 90 of the actuator 10 may include one or more features that locate and retain one or more components of the actuator drive assembly and output. At least some of the locating features may be formed integrally in the housing cover and/or base. That is, when the cover and base are molded, the features may be provided as different surfaces or portions of the molded components of the housing, such that no assembly of parts containing the locating features to the housing is needed. This can greatly facilitate the time, cost and effort needed to assembly the actuator, and provide for more consistent locations of components within a production run of actuators. The actuator, while described in greater detail with regard to a park lock assembly, can be used in other applications in which rotation of an output by an electric motor is desired.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A rotary actuator, comprising:
a drive assembly including a motor and one or more gears coupled to and rotated by the motor;
an output rotated by the drive assembly; and
a housing including a first portion and a second portion coupled to the first portion to define an interior in which at least part of the drive assembly is received, the housing also including a first motor locating feature that engages the motor and positions the motor within the housing and prevents rotation of the motor, and a first gear locating feature that locates and retains the position of at least one of said one or more gears, and wherein the first motor locating feature and first gear locating feature are both integrally formed in the housing,
wherein the first gear locating feature includes a counterbore having an inwardly extending surface that supports one gear of said one or more gears, and wherein the inwardly extending surface is perpendicular to the axis of rotation of said one gear.

2. The actuator of claim 1 wherein the motor includes a first anti-rotation feature and the first motor location feature engages the first anti-rotation feature to inhibit or prevent rotation of the motor relative to the housing.

3. The actuator of claim 2 wherein the motor includes a second anti-rotation feature circumferentially offset from the first anti-rotation feature, and the housing includes a second motor locating feature that engages the second anti-rotation feature to inhibit or prevent rotation of the motor relative to the housing.

4. The actuator of claim 3 wherein the second motor location feature 1 s circumferentially offset from the first motor locating feature.

5. The actuator of claim 3 wherein the first portion of the housing includes a cavity in the interior and in which at least part of the motor is received, and wherein the second motor location feature includes a projection extending into the interior from the second portion of the housing and engaged with the motor.

6. The actuator of claim 2 wherein the first portion of the housing includes a cavity in the interior and in which at least part of the motor is received, and wherein the first motor location feature includes a projection extending inwardly from a wall that defines part of the cavity, and the projection extends into and defines part of the cavity.

7. The actuator of claim 1 wherein the first gear locating feature includes a projection about which at least one gear rotates.

8. The actuator of claim 1 wherein one gear of said one or more gears has an axis of rotation and the first gear locating feature includes an axially extending projection that axially overlaps at least part of said one gear to maintain an axial position of said one gear or to inhibit radial movement of said one gear relative to the projection.

9. The actuator of claim 1 wherein the motor has an axial length defined between two parallel planes at the axial ends of the motor, and the one or more gears are axially positioned between the two planes.

10. The actuator of claim 1 wherein the motor has a radial width defined between two parallel planes at radially opposite outer surfaces of the motor, and the one or more gears are positioned between the two planes or extend outwardly of one or both planes by a distance less than 20% of the diameter of the motor.

11. The actuator of claim 1 wherein the output is received at least partially within the interior for rotation about an axis, and which also includes a bushing or bearing carried by the housing and engaged with the output.

12. The actuator of claim 1 which also includes a circuit board carried by the housing and wherein the housing includes at least one circuit board retaining feature that engages the circuit board and maintains the position of the circuit board within the interior.

13. The actuator of claim 12 wherein the motor has an axial length defined between two parallel planes at the axial ends of the motor, and the circuit board is positioned between the two planes.

14. The actuator of claim 13 wherein the one or more gears are also positioned between the two planes.

15. A rotary actuator, comprising:
a drive assembly including a motor and one or more gears coupled to and rotated by the motor;
an output rotated by the drive assembly; and
a housing including a first portion and a second portion coupled to the first portion to define an interior in which at least part of the drive assembly is received, the housing also including a first motor locating feature that engages the motor and positions the motor within the housing and prevents rotation of the motor, and a first gear locating feature that locates and retains the position of at least one of said one or more gears, and wherein the first motor locating feature and first gear locating feature are both integrally formed in the housing,
wherein one of said one or more gears is an annular gear with inwardly extending teeth that are formed integrally in the same piece of material that defines either the first portion or second portion of the housing.

16. An actuator for a rotatable lock member, comprising:
a drive assembly including a motor and one or more gears coupled to and rotated by the motor;
an output rotated by the drive assembly; and
a housing including a first portion and a second portion coupled to the first portion to define an interior in which at least part of the drive assembly and at least part of the output are received, the first portion includes a first motor locating feature that engages the motor, retains the position of the motor within the housing and inhibits rotation of the motor relative to the housing, the second portion includes a second motor locating feature that engages the motor, retains the position of the motor within the housing and inhibits rotation of the motor relative to the housing, a first gear locating feature that locates and retains the position of at least one of the one or more gears, and a first output locating feature that retains the position of the output relative to the housing, and wherein the first motor locating feature, the second motor locating feature, the first gear locating feature and the first output locating feature are fixed to and/or integrally formed in the housing, wherein the one or more gears includes a planetary gear set having a sun gear driven by the motor, a plurality of planet gears driven by the sun gear, a ring gear defined by teeth extending inwardly from a wall that defines part of the housing and a planet carrier having posts on which the planet gears are arranged, and wherein the output co-rotates with the planet carrier.

17. The actuator of claim 16 wherein the motor has an axis, and the first motor locating feature is circumferentially offset and not axially aligned with the second motor locating feature.

18. The actuator of claim 16 wherein the first output locating feature includes a recess that receives a bushing or bearing that is carried by the housing and engaged with the output.

19. The actuator of claim 16 which also includes a circuit board carried by the housing and wherein the housing includes at least one circuit board retaining feature that engages the circuit board and maintains the position of the circuit board within the interior.

* * * * *